June 2, 1970  M. WILLIAMS ET AL  3,515,978
ALTERNATOR VOLTAGE REGULATORS
Filed May 29, 1968
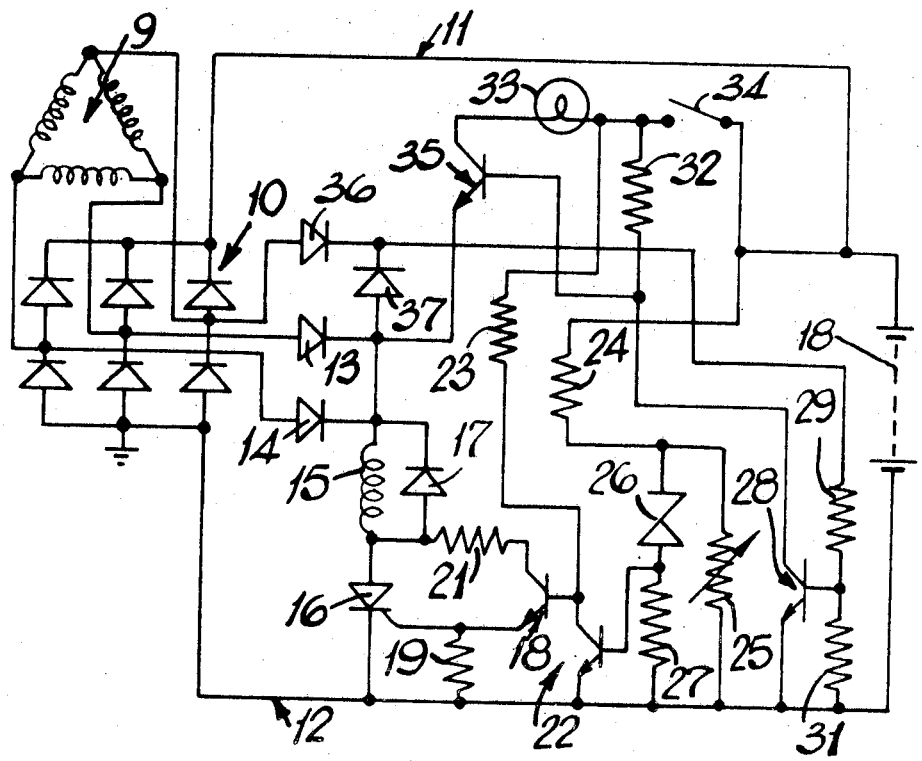
INVENTOR
M. Williams, D.B. Hodgson
BY Glascock, Downing
& Seebold.
ATTORNEYS United States Patent Office 3,515,978
Patented June 2, 1970

3,515,978
ALTERNATOR VOLTAGE REGULATORS
Malcolm Williams, Solihull, and Duncan Barry Hodgson, Leamington Spa, England, assignors to Joseph Lucas (Industries) Limited, Birmingham, England
Filed May 29, 1968, Ser. No. 732,982
Claims priority, application Great Britain, June 2, 1967, 25,591/67
Int. Cl. H02p 9/30; H02j 7/24
U.S. Cl. 322—28    3 Claims

ABSTRACT OF THE DISCLOSURE

A voltage regulator for use in a battery charging system includes a thyristor in series with the field winding of the alternator, and a voltage sensing network for supplying gate current to the thyristor when the battery voltage is below a predetermined value, so that the thyristor conducts. The power for the field winding and thyristor is derived through rectifiers from a proportion only of the phases of the alternator, and so at some point during each cycle of operation of the alternator the current flow through the thyristor will be reduced to zero and it will turn off and remain off if no further gate current is supplied.

---

This invention relates to voltage regulators, particularly for use in battery charging systems on road vehicles.

A voltage regulator according to the invention comprises in combination with a multi-phase alternator, a thyristor connected in series with a field winding of the alternator, the series circuit of field winding and thyristor deriving its power through rectifiers from a proportion only of the phases of the alternator, and means for providing gate current to the thyristor to turn it on as long as the output voltage of the alternator is below a predetermined value, the arrangement being such that because the series circuit of field winding and thyristor receives power from a proportion only of the phase of the alternator, at some point during each cycle of operation of the alternator the current flow through the thyristor will be reduced to zero.

The accompanying drawing is a circuit diagram illustrating one example of the invention.

Referring to the drawing, there are provided positive and negative lines 11, 12 which in use are connected to the battery 8 of a road vehicle. The battery is charged through a full wave rectifier 10 by a three phase alternator 9 driven by the vehicle.

Two phase points of the alternator are connected respectively to the anodes of diodes 13, 14, the cathodes of which are interconnected and connected to the line 12 through the field winding 15 of the alternator and the anode-cathode path of a thyristor 16 in series, the winding 15 being bridged by a diode 17. The gate of the thyristor 16 is connected through a resistor 19 to the line 12, and is further connected to the emitter of an n-p-n transistor 18, the collector of which is connected to the anode of the thyristor 16 through a resistor 21. The base of the transistor 18 is connected to the collector of an n-p-n transistor 22, the emitter of which is connected to the line 12 and the collector of which is connected to the line 11 through a resistor 23 in series with the ignition switch 34 of the vehicle. The base of the transistor 22 is connected to the line 12 through a resistor 27, and to the line 11 through a Zener diode 26 in series with the resistor 24, the series combination of Zener diode 26 and resistor 27 being bridged by a variable resistor 25.

The third phase point of the alternator is connected to the anode of a diode 36, the cathode of which is connected to the line 12 through a pair of resistor 29, 31 in series. The junction of the resistors 29, 31 is connected to the base of an n-p-n transistor 28, the emitter of which is connected to the line 12 and the collector of which is connected to the line 11 through a resistor 32 in series with the ignition switch 34. The collector of the transistor 28 is further connected to the base of an n-p-n transistor 35, the collector of which is connected to the line 11 through a warning lamp 33 and the ignition switch 34 in series, and the emitter of which is connected to the cathodes of the diodes 13, 14 and, through the anode-cathode path of a diode 37, to the cathode of the diode 36.

In operation, when the ignition switch 34 is closed but the alternator is not producing an output, the current will flow through the ignition switch 34 and the resistor 23 to turn the transistor 18 on. At this stage the Zener diode 26 is non-conductive, so the transistor 22 does not conduct. Current then flows through the ignition switch 34, the resistor 32 and the base-emitter of the transistor 35, turning the transistor 35 on and thence to the line 12 through the winding 15 and the collector-emitter path of the transistor 18 to turn the thyristor 16 on. The resulting conduction of the transistor 35 illuminates the warning light 33.

As soon as the alternator produces an output, the potential at the cathode of the diode 37, which it will be noted is connected through all three phase points of the alternator, rises to approximately the potential of the line 11, and so current flows through the resistor 29 to turn on the transistor 28, so removing the base current from the transistor 35, so that the lamp 33 is extinguished. The transistor 18 is held conductive as long as the ignition switch is closed and the Zener diode 26 is non-conducting, and so as long as the output voltage of the alternator is below a predetermined value, the thyristor 16 will be on when the diodes 13 and 14 are forward biased. However, when the predetermined voltage is reached, the Zener diode 26 will conduct, so turning on the transistor 22 and removing the base drive from the transistor 18. The transistor 18 will now no longer provide gate current to the thyristor 16, and because only two of the three phase points supply power to the winding 15, there will be a time in each cycle during which the current through the thyristor 16 will be reduced to zero, and at this point, assuming the Zener diode 26 is conducting, the thyristor 16 will turn off. As soon as power is available through the diodes 13 and 14 to supply the winding 15, the winding 15 will be energised again if and only if the Zener diode 26 has ceased to conduct, that is to say if the output voltage of the alternator has fallen below the predetermined value.

Having thus described our invention what we claim as new and desire to secure by Letters Patent is:

1. A voltage regulator for use in a battery charging system on a road vehicle, comprising, in combination with a multi-phase alternator, a thyristor connected in series with a field winding of the alternator, the series circuit of field winding and thyristor deriving its power through rectifiers from a proportion only of the phases of the alternator, and means including a transistor connected in series with said field winding for providing gate current to the thyristor to turn it on, means being provided for turning said transistor off when the output voltage of the alternator is below a predetermined value, the arrangement being such that because the series circuit of field winding and thyristor receives power from a proportion only of the phases of the alternator, at some point during each cycle of operation of the alternator the current flow through the thyristor will be reduced to zero.

2. A regulator as claimed in claim 1 including a warning lamp which is turned on when the ignition switch of the vehicle is closed and is turned off by the output at the alternator when the alternator produces an output.

3. A regulator as claimed in claim 2 in which the rectifiers feeding the field winding together with one or more further rectifiers connected to the remaining phases of the alternator supply power to turn on a transistor which when conductive causes the warning lamp to be extinguished.

References Cited

UNITED STATES PATENTS

| | | | |
|---|---|---|---|
| 3,009,091 | 11/1961 | Hallidy | 322—73 X |
| 3,349,318 | 10/1967 | Poppinger | 322—73 X |
| 3,430,124 | 2/1969 | Nolan | 322—99 X |

ORIS L. RADER, Primary Examiner

HAROLD HUBERFELD, Assistant Examiner

U.S. Cl. X.R.

320—64; 322—73, 99